(12) United States Patent
Lautenschlager

(10) Patent No.: US 6,303,005 B1
(45) Date of Patent: *Oct. 16, 2001

(54) PROCESS AND DEVICE FOR PRODUCING HIGH-PURITY LIQUID CHEMICALS

(75) Inventor: Werner Lautenschlager, Leutkirch (DE)

(73) Assignee: Mikrowellen-Systeme MWS GmbH (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/933,751

(22) Filed: Sep. 23, 1997

(30) Foreign Application Priority Data

Sep. 23, 1996 (DE) ................................ 196 39 022

(51) Int. Cl.⁷ .................................. B01D 3/42; F05B 6/64
(52) U.S. Cl. .................. 202/160; 137/386; 159/DIG. 26; 202/181; 202/185.1; 202/234; 203/1; 203/2; 203/100; 219/679
(58) Field of Search .................................. 203/10, 100, 1, 203/2; 159/DIG. 26, 26.2, 14, 13.4; 219/688, 772, 679; 202/234, 181, 188, 160, 189, 185.1; 392/403; 137/386

(56) References Cited

U.S. PATENT DOCUMENTS

| 2,455,812 | * | 12/1948 | Schlesman | ........... 159/DIG. 26 |
| 3,495,648 | * | 2/1970 | Amadon | ........... 159/DIG. 26 |
| 3,775,860 | * | 12/1973 | Barnes et al. | ........... 159/DIG. 26 |
| 4,065,361 | * | 12/1977 | Hanson | ........... 159/DIG. 26 |
| 4,313,786 | * | 2/1982 | Smith | ........... 159/DIG. 26 |
| 5,059,287 | * | 10/1991 | Harkey, Sr. | ........... 203/100 |
| 5,211,808 | * | 5/1993 | Vilardi et al. | ........... 159/6.1 |
| 5,565,067 | * | 10/1996 | Chaffin, III | ........... 203/100 |
| 5,643,408 | * | 7/1997 | Sachdeva et al. | ........... 159/26.2 |
| 5,711,857 | * | 1/1998 | Armstrong | ........... 202/235 |

FOREIGN PATENT DOCUMENTS

| 349 009 | | 2/1922 | (DE) . |
| 2 252 860 | | 6/1975 | (FR) . |
| 1074116 | * | 6/1967 | (GB) ........... 219/10.55 |

* cited by examiner

Primary Examiner—Virginia Manoharan

(57) ABSTRACT

For a process for producing high-purity liquids, particularly liquid chemicals, by distillation it is proposed that the liquid to be purified (1) is heated by microwave radiation (5) preferably in the uppermost layers.

To implement this process a device with a liquid container (3), with a heat source (5) acting on the liquid container and with a condensation device (8, 9) connected to the liquid container is proposed, which is distinguished in that the heat source (5) in the form of a microwave radiation source is arranged above the liquid to be purified (1) in such a way that preferably the uppermost layers of the liquid (1) are heated.

14 Claims, 2 Drawing Sheets

PROCESS AND DEVICE FOR PRODUCING HIGH-PURITY LIQUID CHEMICALS

The invention relates to a process for producing high-purity liquid chemicals, by distillation wherein the liquid to be purified is heated by microwave radiation, and a device for implementing this process having a heat source acting on the container of liquid and a condensation device connected to the liquid container wherein the heat source is a microwave radiation source that is arranged above the liquid to be purified.

Chemicals usually contain a certain amount of impurities. To separate the liquid chemical from the impurities it is usually distilled. Distillation comprises evaporating the liquid and condensing the vapors to produce the distillate which is collected together (simple distillation) or in a separate manner according to boiling ranges (fractional distillation). As simple distillation does not achieve complete mixture separation it is only used when high purity is unimportant. Fractional distillation is used, for example, in the treatment of petroleum or the production of alcohol.

Since, according to Raoult's law, the higher-boiling substance also sends a quantity corresponding to its content and vapor pressure into the vapor of the lower-boiling substance, accurate separation is only possible by means of a multiplicity of successive distillation steps. Rectification, in which a so-called distillation column is connected between evaporator and cooler, is a process for the very fine separation of liquid mixtures.

The object of the invention is to provide a further distillation process for producing high-purity liquid chemicals and a device for implementing this process.

The process according to the invention comprises heating the liquid to be evaporated by means of microwave radiation preferably in the uppermost layers while deeper layers remain cooler. This measure may prevent higher-boiling impurities from being entrained into the vapor by bubble formation. In the corresponding device the heat source in the form of a microwave radiation source is arranged above the liquid to be purified.

In development of the invention, convection within the liquid is extensively prevented by introducing horizontal nets or perforated plates into the liquid. This measure may also reduce the effect by which impurities are entrained upwards by the heat transfer within the liquid and find their way into the distillate.

Furthermore, the liquid level in the liquid container is kept constant during the distillation process in that the liquid container is supplied from a level system. For this purpose the liquid container is connected to a storage vessel from which a pump pumps the chemical to be purified into an overflow pipe which is connected in the upper part to the storage vessel and whose bottom end opens into the liquid container at the bottom.

All elements which come into contact with the chemical in the course of the distillation process must be resistant to the chemical used. Glass may be used as material in the case of chemicals which are not excessively aggressive; if the chemical to be purified is hydrofluoric acid, for example, which attacks glass, polytetrafluoroethylene (PTFE) may be used for example.

The sub-claims provide further embodiments and developments of the invention.

BRIEF DESCRIPTION OF THE DRAWINGS

An embodiment of the invention will now be explained with the aid of the drawing, in which.

DESCRIPTION OF THE PREFERRED EMBODIMENTS

The process according to the invention and an embodiment of a device according to the invention will be explained in principle below with the aid of FIG. 1. The liquid chemical to be purified of the container so as to maintain 1 is conveyed via an inlet 2 to the lower region surface 4 constant during the distillation process, the liquid container 3 is supplied from a level system via the inlet 2.

Figure 1:
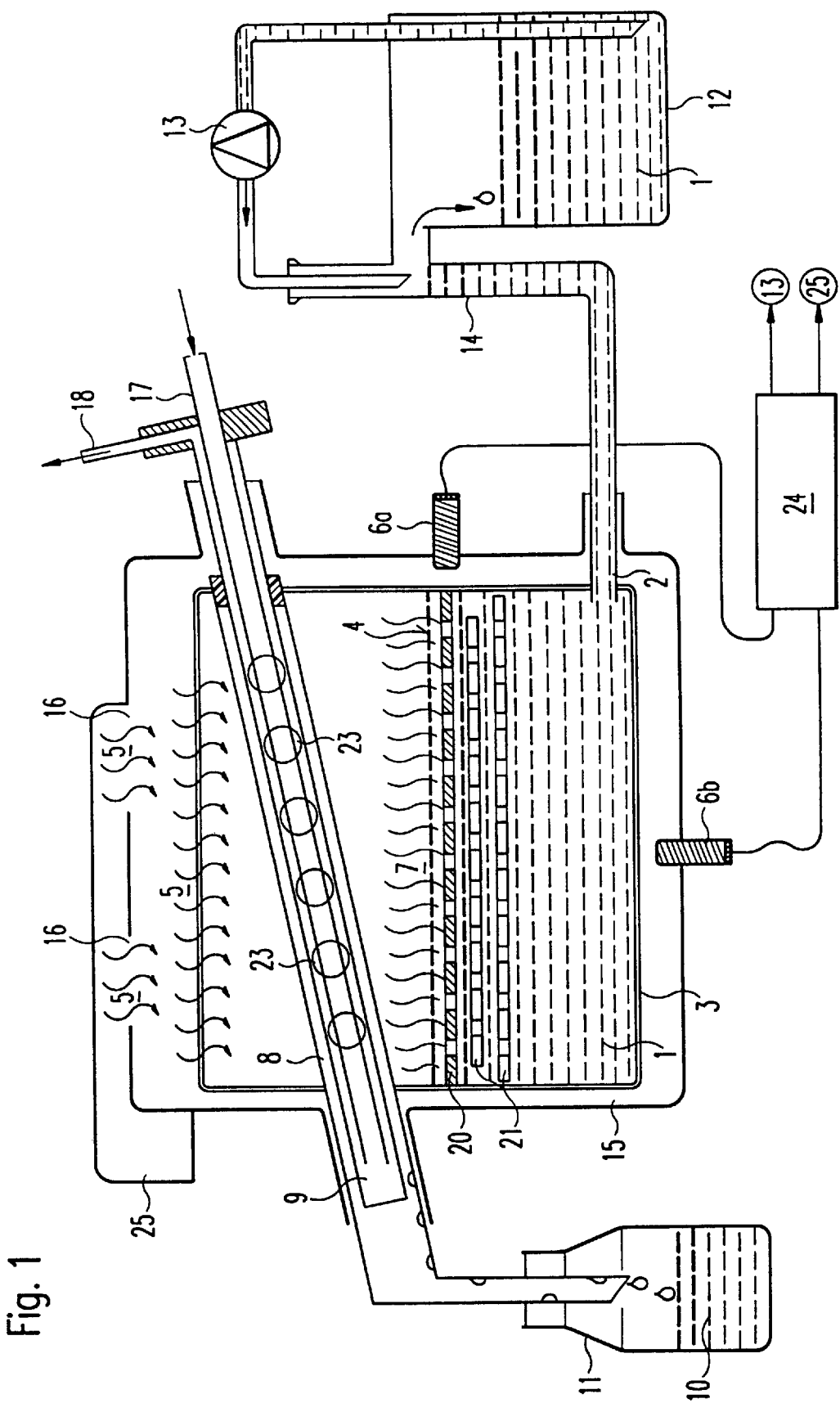
FIG. 1 shows a schematic view of an embodiment of the device according to the invention, which will also serve to explain the process according to the invention.

The level system is shown on the right-hand side of FIG. 1. The liquid chemical to be purified 1 is in a storage vessel 12. From there it is pumped by means of a pump 13 into an overflow pipe 14 which is connected in the upper part to the storage vessel 12 and whose bottom end opens via the inlet 2 into the lower region of the liquid container 3. By means of the level system formed in this way, the level of the liquid surface 4 is constantly kept at the level of the upper end of the overflow pipe 14.

In the embodiment explained here, the liquid container 3 is located in a microwave sample chamber 15 and must consist of a microwave-permeable material. The microwave radiation 5 is generated by a microwave generator 25 and introduced in the upper region of the microwave sample chamber 15 via one or more introduction openings 16. Generally conventional elements may be used to generate the microwave radiation 5 and transfer it from the microwave generator 25 to the introduction openings 16. As the microwave radiation 5 comes from above and as the liquid 1 absorbs the microwave radiation 5, the uppermost layers of the liquid 1 are greatly heated whereas the lower region remains cooler.

Microwave radiation is clearly superior to other heat sources, such as, for example, infra-red radiation. Compared with infrared, the use of microwave beams 5 has the advantage that indirect heating of the upper layers of the liquid 1 is possible if a microwave-absorbing material is introduced in the region of the uppermost layers of the liquid 1 just below the surface 4, as will be explained in greater detail below.

At least two temperature measurement devices 6a and 6b, which are preferably formed as infrared thermosensors, are used to measure the temperature distribution of the liquid 1 in the liquid container 3. A first IR thermosensor 6a measures the temperature in the hotter upper liquid layers and a second IR thermosensor 6b measures the temperature in the lower cooler region of the liquid 1. The thermosensors 6a, 6b are connected to a control unit 24 which is connected in turn to the pump 13 of the level system and to the radiation source 25.

According to the measured result of the temperature distribution, the supply of cold liquid to be purified 1 into the liquid container is controlled on the one hand and the output of the radiation 5 incident on the surface 4 of the liquid 1 on the other hand. By keeping the temperature constant in the upper layers of the liquid 1 and in the lower region, it is possible to prevent any extensive intermixing.

A condensation device is arranged above the liquid surface 4. It is still inside the sample chamber 15 and comprises a guide pipe 8 running downwards in an inclined manner, in which a multiplicity of vapor flow holes 23 are arranged, through which the rising vapor 7 can penetrate into the guide pipe 8. A cooling finger 9 extends concentrically in the guide pipe 8, in which finger a coolant supply pipe 17 runs, also concentrically, and there is a spacing between this pipe and the cooling finger 9. The coolant flows internally in through the coolant supply pipe 17 and flows out again at the other open end of the coolant supply pipe, so that it flows back in the intermediate chamber between coolant supply pipe 17 and cooling finger 9 and finally leaves the condensation device again via a coolant outlet 18. Water or silicone oil, which scarcely absorbs the microwaves and is not directly heated, is suitable as coolant for example.

With correspondingly controlled output of the radiation 5 onto the surface 4 of the liquid 1 the uppermost layers are heated so highly that the lowest-boiling component evaporates out of the liquid 1. The vapor 7 escaping upwards penetrates through the vapor flow holes 23 of the guide pipe 8 and condenses on the cooling finger 9. The condensate 10 drips down onto the inside of the guide pipe 8 and flows along the guide pipe arranged in an inclined manner, into a collecting vessel 11.

All elements which come into contact with the chemical in the course of the distillation process, such as liquid container 3, condensation device 8, 9 or level system 12, 13, 14 must be resistant to the chemical used. Glass may be used as material in the case of chemicals which are not excessively aggressive; if the chemical to be purified is hydrofluoric acid, for example, which attacks glass, polytetrafluoroethylene (PTFE) may be used for example.

As a further structural feature of the device, a net and/or a perforated plate 20 of microwave-absorbing material is horizontally introduced just below the surface level 4 in the liquid container 3. This plate 20 permits indirect heating of the uppermost layers of the liquid 1 with microwave radiation 5. This measure means that the heating of the liquid 1 is concentrated more strongly on the uppermost layers in the liquid container 3 so that entrainment of bubbles of higher-boiling impurities in the liquid 1 is restricted still further and a higher purity of the liquid chemical may be achieved.

Further nets or perforated plates 21 are introduced horizontally in the liquid container 3 underneath the microwave-absorbing perforated plate 20. These plates 21 should preferably be microwave-permeable, particularly when they are arranged in deeper layers in the liquid 1, in order to prevent indirect heating of these deeper layers. This structural measure permits a reduction of convection, i.e., of the heat transfer within the liquid 1. With convection—if it takes place from the bottom upwards—impurities may again be entrained and limit the purity of the liquid chemical which may be achieved with the process.

A higher degree of purity can be achieved by means of the measures according to the invention than with processes known hitherto, as only the uppermost liquid layer is greatly heated and thus scarcely any higher-boiling impurities are entrained into the vapor 7 by means of bubble formation. Purity is also improved by the reduction of the convection within the liquid 1.

The process described above is suitable for producing high-purity liquids of any kind, particularly for liquid chemicals such as are required in the production of semiconductors. An example of such a chemical is hydrofluoric acid.

Figure 2:
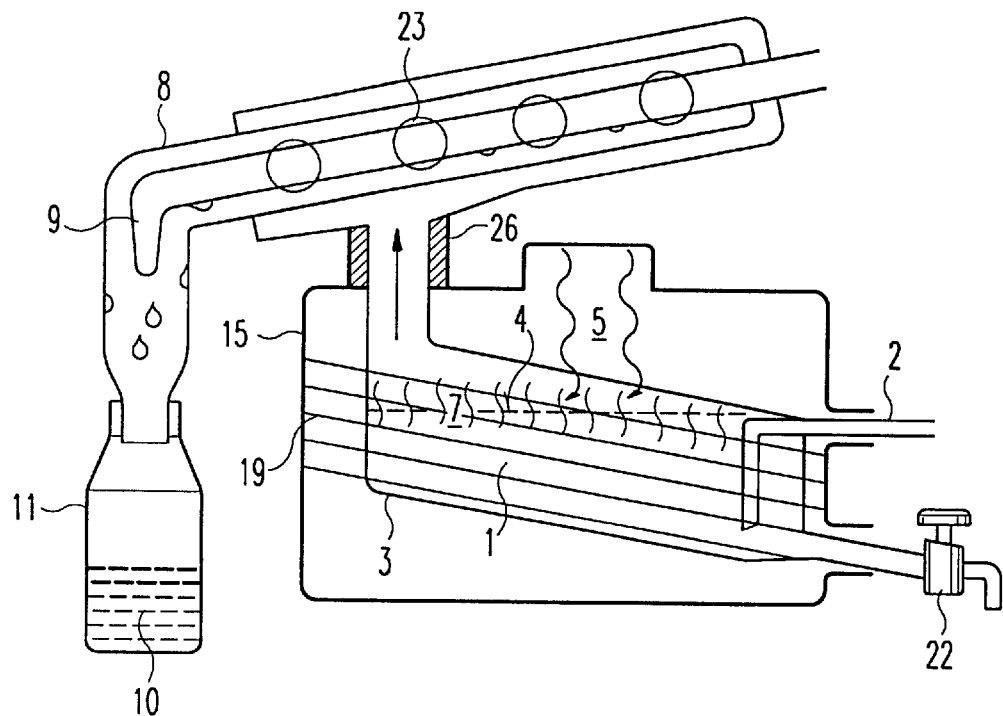
FIG. 2 shows a further embodiment of a device according to the invention in a simplified view.

FIG. 2 shows a further embodiment of a device according to the invention in simplified representation. Parts also shown in FIG. 1 are denoted by the same reference numerals in FIG. 2; their function is not explained again. Level system, thermosensors, control unit and microwave generator are also present in this embodiment even though they are not illustrated for reasons of simplicity; the plates and/or nets for surface heating and for convection reduction may, of course, also be used in this case.

In this embodiment the liquid container 3 is tubular in design and is arranged in the microwave sample chamber 15 in an inclined manner and not horizontally. A drain device 22 is also arranged in the lower region of the liquid container 3 so that the contents of the liquid container 3 may be emptied in a simple manner, for which the inclined position of the liquid container 3 is particularly advantageous. The drain device 22 also permits a draining of the liquid 1 during the distillation process so that an excessively high impurities content in the liquid container 3 may be avoided.

In this case, the entire condensation device comprising guide pipe 8 and cooling finger 9 arranged therein is arranged outside the microwave sample chamber 15. The rising vapor 7 finds its way through a pipe 26 in the upper region of the liquid container 3 above the liquid surface 4 to the guide pipe 8 and enters the guide pipe 8 again through vapor flow holes 23 in order to condense on the cooled cooling finger 9 and flow off into a collecting vessel 11.

To prevent the microwave radiation 5 from being able to penetrate downwards outside the liquid container 3 and thence into the lower layers of the liquid 1 in the liquid container 3, so-called lamellar traps 19 are arranged between the internal wall of the microwave sample chamber 15 and the external wall of the liquid container 3. The lamellar traps consist of a microwave damping or absorbing material and preferably have a mutual spacing, which corresponds to approximately one-quarter of the wavelength of the incident microwave radiation 5, in order thereby further to intensify the absorption of the microwave radiation 5.

Figure 3A:
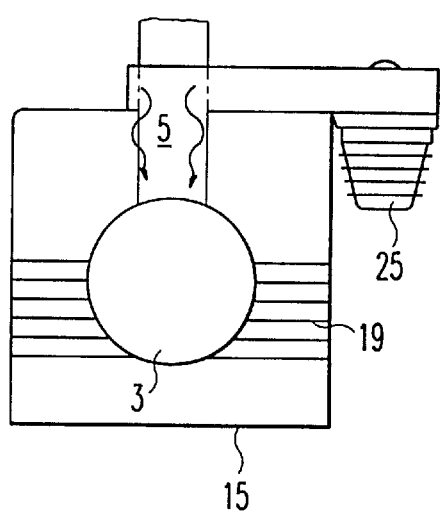
FIG. 3a and FIG. 3b show details of the device of FIG. 2 in two different, simplified views.
Figure 3B:
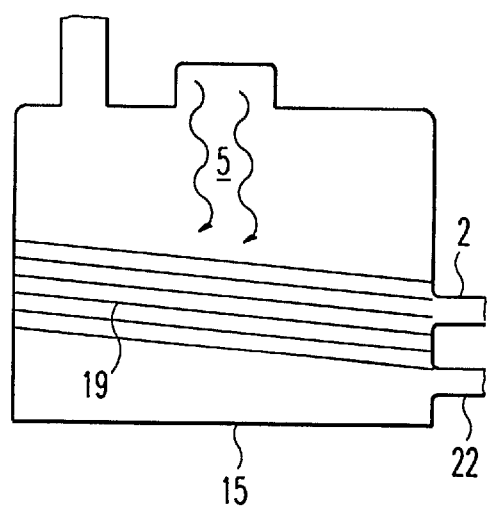

Finally, FIG. 3 shows the embodiment of FIG. 2 in two different views, again greatly simplified, in order to explain the system of the microwave introduction and the lamellar traps 19 in greater detail. FIG. 3b shows the same view as FIG. 2, and FIG. 3a shows the device of FIG. 2 and/or FIG. 3b from the right.

The microwaves 5 generated by the microwave generator 25 are introduced into the microwave sample chamber 15 from above and heat the liquid in the microwave-transparent liquid container 3. The lamellar traps 19 arranged round the liquid container in the same direction as the latter and running parallel to each other absorb the microwave radiation 5 incident from above, by means of their microwave-absorbing properties on the one hand and because of their mutual spacing of a quarter of the wavelength of the microwaves 5 on the other hand. Because of this design the microwaves 5 do not penetrate into the lower region of the sample chamber 15 and cannot therefore heat it.

I claim:

1. A device for producing high-purity liquids by distillation, said device comprising:
   a liquid mixture container for receiving a liquid mixture;
   a microwave radiation generating source disposed to direct microwave radiation upon an upper surface of said liquid mixture in said liquid mixture container to heat the liquid mixture and form, from a component thereof, vapor which rises above said upper surface;
   a liquid condensing device located in the path of said vapor to form condensed liquid therefrom and to direct the condensed liquid to a condensed liquid collection container; and a liquid level system for maintaining a constant level of said upper surface of said liquid mixture in said liquid mixture container, said liquid level system comprising a storage vessel for said liquid mixture, an overflow pipe having an upper end which opens into an upper region of said storage vessel and a pump arranged to pump liquid mixture form said storage vessel into said overflow pipe, said overflow pipe having a lower end in liquid communication with a lower region of said liquid mixture container.

2. A device for producing high-purity liquids by distillation, said device comprising:

a liquid mixture container for receiving a liquid mixture;

a microwave radiation generating source disposed to direct microwave radiation upon an upper surface of said liquid mixture in said liquid mixture container to heat the liquid mixture and form, from a component thereof, vapor which rises above said upper surface; and a liquid condensing device located in the path of said vapor to form condensed liquid therefrom and to direct the condensed liquid to a condensed liquid collection container, said liquid condensing device comprising a guide pipe extending downwardly in an inclined manner, said guide pipe having flow holes therein and a cooling finger extending concentrically within said guide pipe.

3. A device as claimed in claim 2, wherein a coolant supply pipe, which has a spacing from the cooling finger and is open at the bottom end, runs concentrically in the cooling finger so that a coolant flows in internally through the coolant supply pipe, flows out again at the other open end and flows back in an intermediate chamber between the coolant supply pipe and the cooling finger, in order finally to leave the condensing device via a coolant outlet.

4. A device as claimed in claim 3, wherein water or silicone oil is used as coolant for the cooling finger.

5. A device as claimed in claim 3, wherein a condensate flowing off in the guide pipe is collected in the collection container.

6. A device as claimed in claim 5, wherein the condensing device is arranged outside a microwave sample chamber.

7. A device as claimed in claim 2, wherein the condensing device is arranged inside a microwave sample chamber.

8. A device for producing high-purity liquids by distillation, said device comprising:

a liquid mixture container for receiving a liquid mixture;

a microwave radiation generating source disposed to direct microwave radiation upon an upper surface of said liquid mixture in said liquid mixture container to heat the liquid mixture and form, from a component thereof, vapor which rises above said upper surface;

a liquid condensing device located in the path of said vapor to form condensed liquid therefrom and to direct the condensed liquid to a condensed liquid collection container; and at least two temperature measurement devices arranged to monitor the temperature of the liquid mixture in said liquid mixture container near the upper surface of said liquid mixture and near the bottom of said liquid mixture container, respectively, and a control unit responsive to the outputs of said at least two temperature measurement devices to control an amount of radiation incident upon said upper surface and/or a supply of additional liquid mixture into said liquid mixture container.

9. A device as claimed in claim 8, wherein the at least two temperature measurement devices are infrared thermosensors.

10. A device for producing high-purity liquids by distillation, said device comprising:

a liquid mixture container for receiving a liquid mixture;

a microwave radiation generating source disposed to direct microwave radiation upon an upper surface of said liquid mixture in said liquid mixture container to heat the liquid mixture and form, from a component thereof, vapor which rises above said upper surface;

a liquid condensing device located in the path of said vapor to form condensed liquid therefrom and to direct the condensed liquid to a condensed liquid collection container; and a layer of microwave-absorbing material extending approximately horizontally in said liquid mixture container just below said upper surface of said liquid, said layer of microwave absorbing material being effective to concentrate heat from said microwave radiation source to the region of said liquid mixture above said microwave-absorbing material.

11. A device as claimed in claim 10, wherein the liquid mixture container is surrounded by lamellar traps of microwave damping or absorbing material.

12. A device as claimed in claim 11, wherein the lamellar traps are arranged approximately parallel to each other and have a spacing which corresponds approximately to one-quarter of the wavelength of the microwave radiation issuing from the microwave radiation generating source.

13. A device for producing high-purity liquids by distillation, said device comprising; a liquid mixture container for receiving a liquid mixture;

a microwave radiation generating source disposed to direct microwave radiation upon an upper surface of said liquid mixture in said liquid mixture container to heat the liquid mixture and form, from a component thereof, vapor which rises above said upper surface;

a liquid condensing device located in the path of said vapor to form condensed liquid therefrom and to direct the condensed liquid to a condensed liquid collection container; and at least one net or perforated plate arranged horizontally or in an inclined manner within said liquid mixture container, at least one said net or plate being effective to reduce the amount of liquid convection within said liquid mixture container.

14. A device as claimed in claim 13, wherein the at least one net or plate is a microwave-permeable material.

* * * * *

UNITED STATES PATENT AND TRADEMARK OFFICE
CERTIFICATE OF CORRECTION

PATENT NO. : 6,303,005 B1
DATED : October 16, 2001
INVENTOR(S) : Werner Lautenschläger It is certified that error appears in the above-identified patent and that said Letters Patent is hereby corrected as shown below:

<u>Title page,</u>
Item [73], Assignee, "Mikrowellen-Systeme MWS GmbH (CH)" should read
-- Milestone, Inc., Monroe, Connecticut --.

Signed and Sealed this

Twenty-second Day of October, 2002

Attest:

Attesting Officer

JAMES E. ROGAN
*Director of the United States Patent and Trademark Office*